United States Patent
Strobel et al.

(10) Patent No.: US 8,485,348 B2
(45) Date of Patent: Jul. 16, 2013

(54) SUCTION BELT FOR THE TRANSPORT OF TOBACCO

(75) Inventors: Manfred Strobel, Giengen-Sachsenhausen (DE); Frank Bez, Bartholomae (DE); Manfred Schneider, Herbrechtingen (DE)

(73) Assignee: Max Schlatterer GmbH & Co. KG, Herbrechtingen (DE)

( * ) Notice: Subject to any disclaimer, the term of this patent is extended or adjusted under 35 U.S.C. 154(b) by 0 days.

(21) Appl. No.: 13/439,601

(22) Filed: Apr. 4, 2012

(65) Prior Publication Data

US 2012/0255838 A1 Oct. 11, 2012

(30) Foreign Application Priority Data

Apr. 5, 2011 (DE) .......................... 10 2011 006 803

(51) Int. Cl.
*B65G 17/46* (2006.01)
(52) U.S. Cl.
USPC ....................................... 198/689.1; 198/846
(58) Field of Classification Search
USPC ....................................... 198/689.1, 846, 847
See application file for complete search history.

(56) References Cited

U.S. PATENT DOCUMENTS

| | | | | |
|---|---|---|---|---|
| 5,049,425 A * | 9/1991 | Essele | ............................ | 198/846 |
| 5,857,561 A * | 1/1999 | Hardman et al. | ............. | 198/846 |
| 2008/0248233 A1 * | 10/2008 | Levine et al. | .................. | 428/58 |
| 2010/0236034 A1 | 9/2010 | Eagles et al. | | |
| 2010/0236740 A1 * | 9/2010 | Mourad et al. | ................ | 162/289 |
| 2011/0174456 A1 * | 7/2011 | Fernandes et al. | ............. | 162/203 |
| 2011/0247776 A1 * | 10/2011 | Quigley | ....................... | 162/348 |

FOREIGN PATENT DOCUMENTS

| | | |
|---|---|---|
| DE | 19732196 A1 | 1/1999 |
| DE | 19909031 A1 | 9/2000 |
| WO | WO99/04656 | 2/1999 |

OTHER PUBLICATIONS

DE 19909031A1 English Translation.
DE 19732196A1 English Translation.
DE 102011006803.1—Office Action from German Patent Office (translation to follow).

* cited by examiner

*Primary Examiner* — James R Bidwell
(74) *Attorney, Agent, or Firm* — Jon Fallon, Esq.

(57) ABSTRACT

A suction belt (1) for transporting tobacco in the manufacture of cigarettes has a fabric (5) comprising warp threads (6) and weft threads (7), the ends (2,3) of which suction belt are connected in a connecting region (4) to form a continuous suction belt (1). The weft threads (7) and/or the warp threads (6), at least in the connecting region (4), have a light-absorbing material (8). The continuous suction belt (1) is laser welded in the connecting region (4).

10 Claims, 1 Drawing Sheet

SUCTION BELT FOR THE TRANSPORT OF TOBACCO

FIELD OF THE INVENTION

The invention relates to a suction belt for transporting tobacco in the manufacture of cigarettes, which has a fabric comprising warp threads and weft threads, according to the type more closely defined in the preamble to claim 1. The invention further relates to a method for producing a suction belt for transporting tobacco in the manufacture of cigarettes, according to the type more closely defined in the preamble to claim 9.

BACKGROUND OF THE INVENTION

A suction belt of the generic type, and a corresponding method, are known from DE 199 09 031 A1. The suction belts generally have a specific length and are then connected to each other at their two ends to form a continuous belt. The fabric of these suction belts is frequently produced from monofilament threads, wherein polyamide and polyester materials are normally used. Due to specific requirements placed on the physiology of the materials, materials with crystalline or part-crystalline structure have recently preferably been used, wherein polyether materials such as, for instance, PEK, PEEK, PEKK, PEEKK have proved most suitable. Due to the very small temperature window between a material softening and the complete liquefaction of the material, these materials are only partially suitable for the use of high-frequency or ultrasound connecting methods, so that great efforts have been made to enable suitable methods for connecting the two ends of the suction belt to form a continuous belt. To date, however, there have been no suction belts available which can be easily produced.

OBJECT AND SUMMARY OF THE INVENTION

The object of the present invention is therefore to provide a suction belt for transporting tobacco and a method for producing such a suction belt, wherein it is easily possible to connect the two ends of the suction belt.

According to the invention, this object is achieved by virtue of the features stated in claim 1.

By virtue of the inventive light-absorbing material possessed by the weft threads and/or warp threads of the suction belt according to the invention, a laser beam directed at the suction belt can be absorbed by the weft threads and/or warp threads and the structure of the weft threads and/or warp threads can be changed such that the two ends of the suction belt melt to the desired extent and can be joined in this state. Since the material of the warp and weft threads of the suction belt is usually transparent, it is permeable to laser beams, so that a laser welding of the suction belt to the hitherto used materials was not possible and is only now enabled by the inventive realization of the weft threads and/or warp threads.

In an advantageous refinement of the invention, it can be provided that the light-absorbing material is incorporated in particle form in the weft threads. This represents a particularly simple possible means of integrating the light-absorbing material in the weft threads.

Alternatively thereto or, where necessary, even additionally, it can be provided that the weft threads have a transparent thread core and a sheath made of the light-absorbing material. The laser radiation is here absorbed by the sheath made of the light-absorbing material, whereby the structure of the sheath is changed such that the ends of the suction belt can be connected to each other. The transparent thread core, in which no absorption of the laser beam takes place, is here fully preserved. Naturally, it is here also possible to arrange the light-absorbing material in particle form in the sheath. Where necessary, mixtures of these two solutions are also possible, in which one part of the weft threads has the light-absorbing material in particle form and another part has a transparent thread core and a sheath made of the light-absorbing material.

It can further be provided that the light-absorbing material is incorporated in particle form at least in a part of the warp threads, whereby the strength of the connection of the two ends of the suction belt can be improved.

If, alternatively thereto or additionally, it is provided that at least a part of the warp threads has a transparent thread core and a sheath made of the light-absorbing material, the arrangement of the light-absorbing material in the weft threads can, where necessary, be fully dispensed with. As a result of the construction of the warp threads with the transparent thread core and the construction of the sheath made of the light-absorbing material, it is namely possible to construct the warp threads such that they absorb the laser radiation, whereby the structure of the warp threads is changed such that the two ends of the suction belt can be joined. The fact that the light-absorbing material is here found only in the sheath means that the thread core retains its original characteristics, so that the strength of the warp threads is only slightly reduced, such that these can also contribute to the strength of the entire suction belt. Here too, it is possible to arrange the light-absorbing material in particle form in the sheath. The above-stated mixture of these two solutions, in which a part of the warp threads has the light-absorbing material in particle form and another part has a transparent thread core and a sheath made of the light-absorbing material, is also conceivable.

it has proved particularly suitable for the absorption of the laser beams if the light-absorbing material contains carbon.

In order to still further improve the absorption of the laser radiation in the connecting region of the suction belt and thus achieve a better connection of the two ends of the suction belt, it can further be provided that the light-absorbing material has a light-absorbing coloring substance and/or a light-absorbing film. In this way, for example, portions of the weld, in particular the marginal regions of the same, can be strengthened still further.

The requirements placed on the threads of the suction belt according to the invention, for example high tearing strength and wear resistance, high modulus of elasticity, physiological innocuousness with regard to health risks and the prevention of the release of toxic substances in the course of the combustion, can be particularly well met if the warp threads and the weft threads consist of a polymeric material having a crystalline or part-crystalline structure.

A method-based solution of the object is obtained by virtue of the features of claim 9. With this method, the suction belt according to the invention can be produced very easily in a process-reliable and, where necessary, automatable manner.

A better connection of the two ends of the suction belt can be achieved if, in an advantageous refinement of the method, during the welding in the connecting region, pressure is applied to the fabric.

BRIEF DESCRIPTION OF THE DRAWINGS

Illustrative embodiments of the invention are depicted in basic representation below with reference to the drawings, wherein.

DETAILED DESCRIPTION OF THE INVENTION

Figure 1:
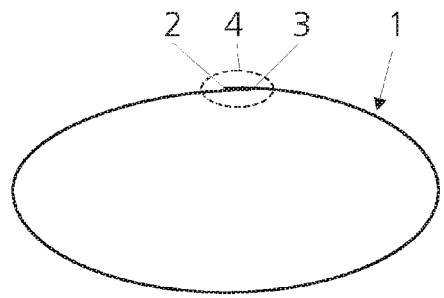
FIG. 1 shows a highly schematic representation of a suction belt according to the invention.

FIG. 1 shows a suction belt 1, which serves for transporting tobacco in the manufacture of cigarettes. The suction belt 1 has two ends 2 and 3, which are connected to each other in a connecting region 4 indicated by the dashed line, whereby a continuous suction belt 1 is produced.

Figure 2:
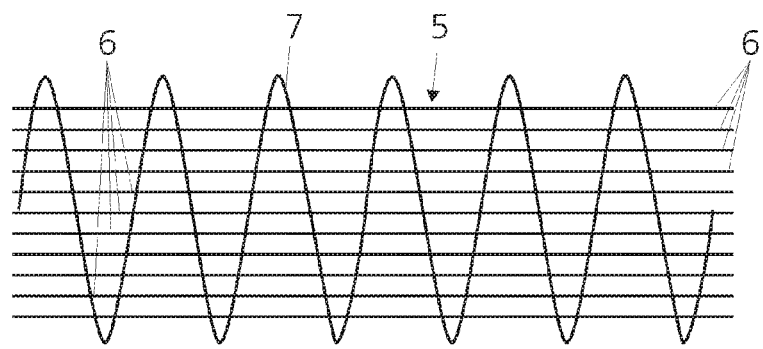
FIG. 2 shows an enlarged representation of the connecting region of the suction belt according to the invention.

In the highly schematic representation of the suction belt 1 according to FIG. 2, it can be seen that the same has a fabric 5 comprising warp threads 6 and weft threads 7 or one weft thread 7. Preferably, the warp threads 6 and the weft threads 7 consist of a polymeric material having a crystalline or part-crystalline structure. In particular, the polymeric material is constituted by a material from the polyether ketone family. The materials PEK, PEEK, PEKK, PEEKK are particularly preferred. The warp threads 6 and the weft threads 7 are preferably constituted by monofilament threads.

Since a crystalline or part-crystalline material of this type cannot in itself absorb any light, the weft threads 7 or weft thread 7, if just one weft thread 7 is provided, at least in the connecting region 4 has/have a light-absorbing material 8 (discernible in FIGS. 3 and 4), so that the weft threads 7, despite the abovementioned material of which they consist, are capable of absorbing light. It is thereby possible to weld together the suction belt 1 in the connecting region 4 by means of a laser beam. The procedure followed in the laser welding of the suction belt 1, and details thereof, will be examined at a later point. By the statement "at least in the connecting region 4" is meant that, in those portions of the weft threads 7 which are different from the connecting region 4, the light-absorbing material 8 can be dispensed with. The connecting region 4 can also appear or be provided repeatedly in the suction belt 1, for instance if two mutually parallel running or two mutually offset weld seams are provided. A further possibility consists in constructing the suction belt 1 from more than one part, so that two or more connecting regions 4 are necessary to form the continuous suction belt 1.

It can be provided that the light-absorbing material 8 is provided only in the weft threads 7, whereby the strength of the suction belt 1 is not reduced, since the warp threads 6 lend the fabric 5 of the suction belt 1 its strength and the light-absorbing material 8 is not provided in the warp threads 6. Where such is necessary in order to achieve a specific strength in the connecting region, it is also conceivable, however, to provide a part of the warp threads 6, at least in the connecting region 4, with the light-absorbing material 8, in order to achieve a better connection of the two ends 2 and 3 of the suction belt 1. A compromise should here be found between an adequate strength in the connecting region 4, which strength can be achieved by the incorporation of the light-absorbing material 8 in the warp threads 6, and an adequate strength of the suction belt 1 as a whole, which can be achieved by leaving the warp threads 6 in their original state, i.e. without incorporating the light-absorbing material 8.

Since a multiplicity of warp threads 6 is present over the width of the suction belt 1, this can be resolved for the respective case by providing just a certain share of the warp threads 6, for instance every second or every third warp thread 6, with the light-absorbing material 8. A similar solution is also conceivable for the weft thread 7, if this consists, for example, of a plurality of individual threads of which only a certain number have the light-absorbing material 8. In principle, it can thus be provided that the light-absorbing material 8 in the connecting region 4 has zones having different absorption coefficients.

Figure 3:
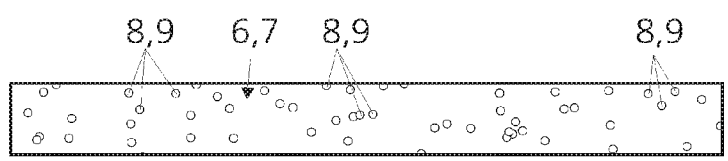
FIG. 3 shows a first embodiment of a weft thread or warp thread of the suction belt according to the invention.

Preferably, the light-absorbing material 8 contains carbon, which is preferably present in the form of carbon particles 9, as is represented in the embodiment of the weft thread 7 or warp thread 6 according to FIG. 3. The carbon particles 9, which are present, in particular, in the form of soot particles, are preferably constituted by nano carbon particles 9, which, because of their fineness, do not impair the structuring of the polymer structure of the weft threads 7 or warp threads 6. By varying the soot quality, i.e. the carbon component in the soot, the incorporated carbon quantity and/or the particle size, it is possible to control the absorption of the laser radiation. Where necessary, the carbon which forms the light-absorbing material 8 can also be present in another form and it is also possible to use another light-absorbing material 8 instead of carbon.

Preferably, dyes and/or pigments which are capable of thermal interaction with infrared radiation (IR radiation) are used for the absorption.

Additionally or alternatively to the embodiment represented in FIG. 3, it can also be provided that the light-absorbing material 8 has a light-absorbing coloring substance and/or a light-absorbing film. A light-absorbing coloring substance and/or film of this kind can be provided in the connecting region 4 additionally or alternatively to the above-described configuration of the weft threads 7 or warp threads 6.

Figure 4:
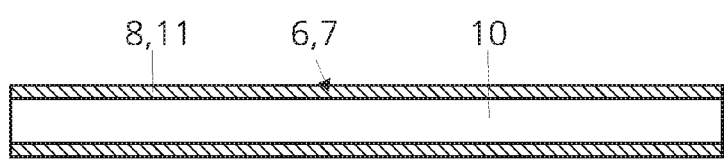
FIG. 4 shows a further embodiment of the weft thread or warp thread of the suction belt according to the invention.

In the embodiment according to FIG. 4, the weft thread 7 or the warp thread 6 has a transparent thread core 10, i.e. a thread core 10 consisting of the above-described transparent plastics material, and a sheath 11 consisting of or containing the light-absorbing material 8. Of course, it is not necessary for the sheath 11 to fully consist of the light-absorbing material, but instead the light-absorbing material 8 could once again be present in the form of carbon particles 9 and/or as a light-absorbing coloring substance and/or as a light-absorbing film. In the embodiment comprising the sheath 11 around the thread core 10, only the surface of the weft thread 7 or warp thread 6 is partially melted, since the thread core 10 absorbs no laser radiation.

That embodiment of the weft thread 7 which is represented in FIG. 4 is suitable, in particular, for the formation of the warp thread 6, since the transparent thread core 10 ensures the necessary strength of the warp thread 6. In this case, the light-absorbing material 8 in the weft threads 7 could, where necessary, be dispensed with.

Figure 5:
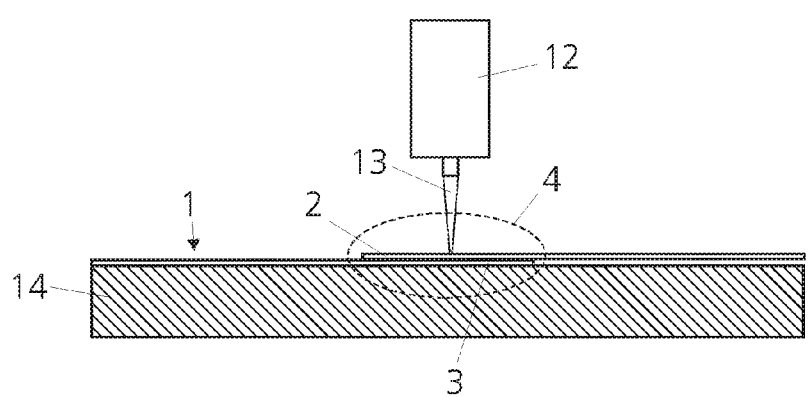
FIG. 5 shows the step comprising the connection of the two ends of the suction belt according to the invention in the connecting region upon implementation of the method according to the invention.

In FIG. 5, the method step of connecting the two ends 2 and 3 of the suction belt 1 in the connecting region 4 is represented. By means of a laser beam generating device 12, a laser beam 13 is here directed onto the fabric 5, resting on a support 14, of the suction belt 1 in the connecting region 4 and is absorbed by the light-absorbing material 8 in the weft threads 7 or in the warp threads 6. This leads to such a change in the structure of the weft threads 7 or warp threads 6 that these melt homogeneously and the two ends 2 and 3 can be connected to each other. Preferably, during the welding in the connecting region 4, a pressure is applied to the fabric 5 in order to join together the two ends 2 and 3 of the same. In particular, this measure enables a similar thickness to be reached in the connecting region 4 as in the rest of the suction belt 1, so that the thereby connected suction belt 1 has a uniform thickness.

Preferably, the weft threads 7 or warp threads 6 provided with the light-absorbing material 8 are woven into the suction belt 1 such that, upon subsequent connection by means of the laser beam 13, only certain groups of threads are connected.

The invention claimed is:

1. suction belt for transporting tobacco in the manufacture of cigarettes, which has a fabric comprising:
    warp threads and weft threads and the ends of which are connected in a connecting region to form a continuous suction belt, characterized in that the weft threads and/or the warp threads, at least in the connecting region, have a light-absorbing material, and in that the continuous suction belt is laser welded in the connecting region.

2. The suction belt as set forth in claim 1, wherein the light-absorbing material is incorporated in particle form in the weft threads.

3. The suction belt as set forth in claim 1, wherein the weft threads have a transparent thread core and a sheath made of the light-absorbing material.

4. The suction belt as set forth in claim 1, wherein the light-absorbing material is incorporated in particle form at least in a part of the warp threads.

5. The suction belt as set forth in claim 1, wherein at least a part of the warp threads has a transparent thread core and a sheath made of the light-absorbing material.

6. The suction belt as set forth in claim 1, wherein the light-absorbing material contains carbon.

7. The suction belt as set forth in claim 1, wherein the light-absorbing material has a light absorbing coloring substance and/or a light absorbing film.

8. The suction belt as set forth in claim 1, wherein the warp threads and the weft threads consist of a polymeric material having a crystalline or part-crystalline structure.

9. A method for producing a continuous suction belt for transporting tobacco in the manufacture of cigarettes, comprising the steps of:
    producing a fabric from warp threads and weft threads;
    connecting the fabric at its two ends in a connecting region to form a continuous belt;
    arranging a light-absorbing material at least in the connecting region in one or both of the weft threads and the warp threads; and
    welding together the suction belt in the connecting region by means of a laser beam to form the continuous suction belt.

10. The method as set forth in claim 9, further comprising the step of applying pressure to the fabric during the welding in the connecting region.

* * * * *